3,483,234
STEROIDAL 17-ADAMANTOYL ESTERS
Paul D. Klimstra, Northbrook, Ill., assignor to G. D. Searle & Co., Chicago, Ill., a corporation of Delaware
No Drawing. Filed Oct. 17, 1966, Ser. No. 586,920
Int. Cl. C07c 169/24, 167/28; A61k 27/00
U.S. Cl. 260—397.4                                     7 Claims

ABSTRACT OF THE DISCLOSURE 17-adamantoyl steroid esters characterized by pronounced oral anabolic potency and also androgenic activity are prepared by esterification of the corresponding 17-hydroxy steroid with an adamantoic acid halide or anhydride.

---

The present invention is concerned with certain potent anabolic steriodal 17-adamantoyl esters, of especial interest in view of their pronounced oral potency. The particular steroidal esters contemplated are members of the androstane family and include those substituted by a methyl group as typified by 17β-adamantoyloxy-7α-methylandrost-4-en-3-one and 17β-adamantoyloxy-1α-methyl-5α-androstan-3-one, those characterized by a 2-halo-$\Delta^1$ structure as exemplified by 17β-adamantoyloxy-2-bromo-5α-androst-1-en-3-one and 17β-adamantoyloxy-2-chloro-5α-androst-1-en-3-one and those containing a $\Delta^2$ double bond such as 17β-adamantoyloxy-5α-androst-2-ene.

A preferred embodiment of the present invention consists of the adamantoyl esters characterized by a 3-keto substituent as represented by the aforementioned 17β-adamantoyloxy - 7α - methylandrost - 4 - en - 3 - one, 17β-adamantoyloxy-1α-methyl-5α-androstan-3-one, 17β-adamantoyloxy-2-bromo-5α-androst-1-en-3-one and 17β-adamantoyloxy-2-chloro-5α-androst-1-en-3-one.

The instant adamantoyl esters are particularly advantageous over the corresponding 17-hydroxy compounds by virtue of the potent oral anabolic activity of those esters. Although adamantoyloxy steroids have previously been reported by Rapala et al., J. Med. Chem., 8, 580 (1965), to exhibit anabolic activity when administered subcutaneously, the oral anabolic potency of such esters has not been previously disclosed. It is of interest to note, furthermore, that 17β-adamantoyloxy-androst-4-en-3-one, disclosed by Rapala et al., is devoid of oral anabolic activity while the instant corresponding 7α-methyl compound, i.e. 17β-adamantoyloxy-7α-methyl-androst-4-en-3-one, exhibits pronounced oral anabolic potency.

The compounds of the present invention, in addition to their potent anabolic properties, exhibit androgenic activity also. These compounds are, furthermore, especially valuable in view of the absence of side-effects frequently possessed by hormone-like substances. They are, for example, lacking in estrogenic, progestational, antifertility and anti-estrogenic properties.

A process suitable for the manufacture of the compounds of this invention involves reaction of the corresponding 17-hyroxy compound with an adamantoic acid anhydride or halide, preferably in the presence of a suitable acid acceptor, or, alternatively, with adamantoic acid in the presence of a suitable acid catalyst such as p-toluenesulfonic acid. The process is preferably conducted in an inert non-polar organic solvent at an elevated temperature. The aforementioned 17β-adamantoyloxy-7α-methylandrost-4-en-3-one, for example, is produced when 17β-hydroxy-7α-methylandrost-4-en-3-one is contacted with adamantoic acid chloride in benzene solution at the reflux temperature.

The 1α-methyl and 2-halo-$\Delta^1$ compounds of this invention are alternatively produced by methods which utilize the corresponding 1-dehydro compound as the starting material. Reaction with an organometallic reagent such as methyl magnesium bromide results in the corresponding 1α-methyl derivative. 17β-adamantoyloxy-5α-androst-1-en-3-one is thus contacted with ethereal methyl magnesium bromide and a catalytic quantity of cuprous chloride in tetrahydrofuran to produce 17β-adamantoyloxy-1α-methyl-5α-androstan-3-one. Epoxidation of that 1-dehydro starting material with alkaline hydrogen peroxide in a suitable solvent such as methanol affords the corresponding 1α,2α-epoxy substance, which is then contacted with the appropriate hydrohalic acid in a solvent such as acetone. When the hydrohalic acid is hydrochloric, for example, the intermediate 17β-adamantoyloxy-1α,2α-epoxy-5α-androstan-3-one is converted to the instant 17β-adamantoyloxy-2-chloroandrost-1-en-3-one.

The invention is described in greater detail in the examples which follow. These examples are, however, meant to be illustrative only, and should not be construed as limiting the invention either in spirit or in scope. Those skilled in the art will envisage many modifications both in materials and methods. The temperatures disclosed are in degrees centigrade (°C.) and, unless otherwise noted, quantities are given in parts by weight.

EXAMPLE 1

A mixture of 4.7 parts of adamantoic acid with 19.7 parts of thionyl chloride is heated at the reflux temperature for about 1 hour. The excess reagent is then removed by co-distillation with benzene under reduced pressure. The solid residual adamantoic acid chloride is dissolved in 44 parts of benzene, and the resulting solution is then added to a solution of 5 parts of 17β-hydroxy-5α-androst-1-en-3-one in 176 parts of benzene. 4 parts of pyridine is added, and the resulting reaction mixture is stirred and heated at the reflux temperature for about 16 hours. At the end of that reaction period, the mixture is partitioned between water and ether. The ether layer is separated, washed successively with water, dilute aqueous sodium carbonate and water, then dried over anhydrous sodium sulfate. Removal of the solvent by distillation under reduced pressure affords the crude product as a solid. Purification is effected by recrystallization from acetone-methanol, thus affording pure 17β-adamantoyloxy-5α-androst-1-en-3-one, which melts at about 218–219°. It is further characterized by an optical rotation of +50° and also by an ultraviolet absorption maximum at about 228.5 millimicrons with a molecular extinction coefficient of about 10,900.

EXAMPLE 2

To a solution of 50 parts by volume of 3 molar ethereal methyl magnesium bromide in 90 parts of tetrahydrofuran is added, over a period of about 45 minutes, at 0–5° in a nitrogen atmosphere with stirring, a solution of 5 parts of 17β-adamantoyloxy-5α-androst-1-en-3-one in 45 parts of tetrahydrofuran. Stirring is continued for approximately 30 minutes longer, at the end of which time the reaction mixture is poured carefully into a mixture of ice and aqueous sodium chloride. That aqueous layer is made acidic by the addition of dilute hydrochloric acid, then is extracted with ether. The ether layer is separated, washed several times with water, dried over anhydrous sodium sulfate containing decolorizing carbon and stripped of solvent by distillation under reduced pressure. The resulting solid crude product is purified by recrystallization from methanol to yield 17β-adamantoyloxy-1α-methyl-5α-androstan-3-one, melting at about 279–281°. This compound exhibits an optical rotation, in chloroform, of +29.5° and is characterized further by the following structural formula

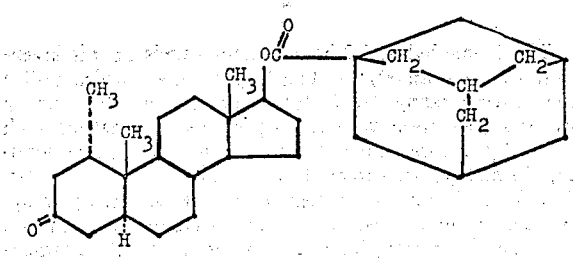

EXAMPLE 3

To a solution of 5 parts of 5α-androst-2-en-17β-ol in 176 parts of benzene containing 4 parts of pyridine is added a solution of 5 parts of adamantoic acid chloride in 44 parts of benzene, prepared from 5 parts of adamantoic acid and 19.7 parts of thionyl chloride by the procedure described in Example 1. The resulting reaction mixture is heated at reflux temperature for about 15 hours, then is cooled and partitioned between ether and water. The ether layer is separated, washed successively with water, dilute aqueous sodium carbonate and water, then dried over anhydrous sodium sulfate containing decolorizing carbon and stripped of solvent under reduced pressure to afford a solid residue. Purification of that crude product by recrystallization from methanol-ethanol affords pure 17β-adamantoyloxy-5α-androst-2-ene, which exhibits a melting point at about 228–230° and an optical rotation in chloroform, of +49.5°. This compound is represented by the following structural formula

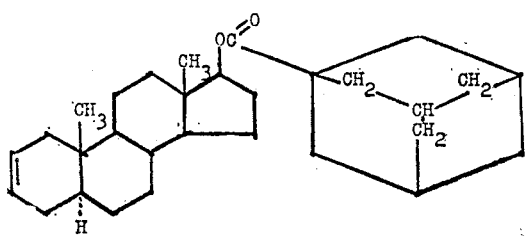

EXAMPLE 4

A mixture containing 3.6 parts of 17β-hydroxy-7α-methylandrost-4-en-3-one, 3 parts of adamantoyl chloride, 3 parts of pyridine and 88 parts of benzene is heated at the reflux temperature for about 20 hours, during which time a precipitate of pyridine hydrochloride is formed. The reaction mixture is cooled, then diluted with ether. That organic solution is then washed successively with water and dilute aqueous sodium bicarbonate, dried over anhydrous sodium sulfate and stripped of solvent by distillation under reduced pressure. The resulting crude solid product is purified by recrystallization first from acetone then from methanol, thus producing pure 17β-adamantoyloxy-7α-methylandrost-4-en-3-one, melting at about 188–189°. An ultraviolet absorption maximum is observed at about 242 millimicrons with a molecular extinction coefficient of about 15,300. This compound is represented by the following structural formula

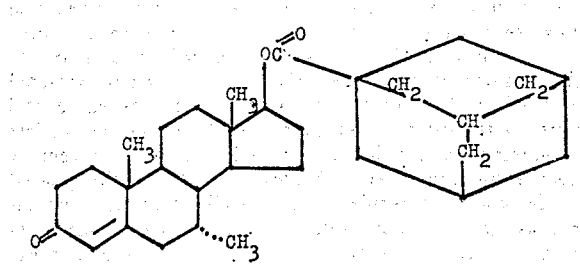

EXAMPLE 5

A mixture containing 1 part of 2-chloro-17β-hydroxy-5α-androst-1-en-3-one, 1 part of adamantoic acid chloride, 1 part of pyridine and 44 parts of benzene is heated at the reflux temperature for about 16 hours, then is cooled to room temperature and washed successively with dilute aqueous sodium bicarbonate and water. That washed solution is dried over anhydrous sodium sulfate and concentrated to dryness under reduced pressure to afford the crude solid product. Recrystallization of that crude material from aqueous acetone results in pure 17β-adamantoyloxy-2-chloro-5α-androst-1-en-3-one, melting at about 170–175°.

This compound is represented by the following structural formula

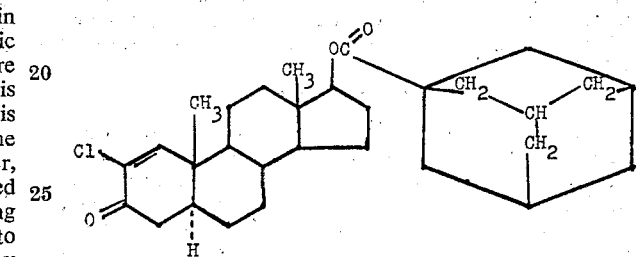

EXAMPLE 6

A mixture containing 3 parts of 2-bromo-17β-hydroxy-5α-androst-1-en-3-one, 3 parts of adamantoic acid chloride, 3 parts of pyridine and 132 parts of benzene is heated at the reflux temperature for about 16 hours, then is cooled and washed, first with dilute aqueous sodium bicarbonate then with water. Drying of the resulting organic solution over anhydrous sodium sulfate followed by removal of the solvent by means of distillation under reduced pressure affords the crude product. Recrystallization of that crude solid material from acetone-methanol yields 17β-adamantoyloxy-2-bromo-5α-androst-1-en-3-one, melting at about 248–249°. It is represented by the following structural formula

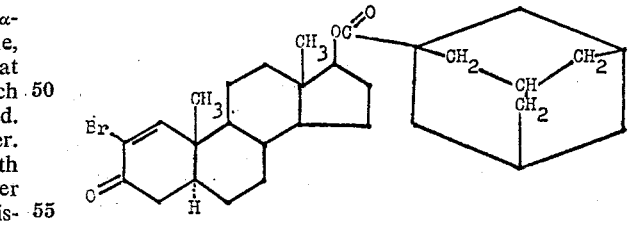

What is claimed is:
1. A 17β-adamantoyloxy steroid of the androstane series selected from the group consisting of 17β-adamantoyloxy-7α-methylandrost-4-en-3-one, 17β - adamantoyloxy - 1α - methyl - 5α - androstan-3-one, 17β - adamantoyloxy - 2 - bromo-5α-androst - 1 - en - 3 - one, 17β-adamantoyloxy-2-chloro-5α-androst-1-en-3-one and 17β-adamantoyloxy-5α-androst-2-ene.

2. As in claim 1, a 3-keto-17β-adamantoyloxy steroid of the androstane series selected from the group consisting of 17β-adamantoyloxy-7α-methylandrost-4-en-3-one, 17β-adamantoyloxy-1α-methyl-5α-androstan - 3 - one, 17β-adamantoyloxy - 2 - bromo - 5α - androst-1-en-3-one and 17β-adamantoyloxy-2-chloro-5α-androst-1-en-3-one.

3. As in claim 1, the compound which is 17β-adamantoyloxy-7α-methylandrost-4-en-3-one.

4. As in claim 1, the compound which is 17β-adamantoyloxy-1α-methyl-5α-androstan-3-one.

5. As in claim 1, the compound which is 17β-adamantoyloxy-2-bromo-5α-androst-1-en-3-one.
6. As in claim 1, the compound which is 17β-adamantoyloxy-2-chloro-5α-androst-1-en-3-one.
7. As in claim 1, the compound which is 17β-adamantoyloxy-5α-androst-2-ene.

References Cited

UNITED STATES PATENTS

| | | | |
|---|---|---|---|
| 3,069,435 | 12/1962 | Wiechert et al. | 260—397.4 |
| 3,080,395 | 3/1963 | Orr et al. | 260—397.4 |
| 3,239,542 | 3/1966 | Bowers et al. | 260—397.5 |
| 3,262,949 | 7/1966 | Ringold et al. | 260—397.3 |

OTHER REFERENCES

Rapala, R., Chem. Abstracts, vol. 65, 1966, page 5506 h.

Mori, Hiromu, Chem. & Pharm. Bull'n, Japan, 10, May 1962, pp. 386–390.

Rapala, R., Journ. Med. Chem., vol. 8, September, 1965, pp. 580–583.

LEWIS GOTTS, Primary Examiner

ETHEL G. LOVE, Assistant Examiner

U.S. Cl. X.R.

260—397.5, 239.55, 999